US012675275B2

(12) United States Patent
Rhodes

(10) Patent No.: US 12,675,275 B2
(45) Date of Patent: Jul. 7, 2026

(54) UPDATING SOFTWARE APPLICATIONS TO FACILITATE COMPLIANCE WITH STANDARD REQUIREMENTS IN A DISTRIBUTED COMPUTING SYSTEM

(71) Applicant: Truist Bank, Charlotte, NC (US)

(72) Inventor: Cynthia Rhodes, Orlando, FL (US)

(73) Assignee: Truist Bank, Charlotte, NC (US)

( * ) Notice: Subject to any disclaimer, the term of this patent is extended or adjusted under 35 U.S.C. 154(b) by 224 days.

(21) Appl. No.: 18/436,064

(22) Filed: Feb. 8, 2024

(65) Prior Publication Data

US 2025/0258662 A1 Aug. 14, 2025

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .............................. G06F 8/60–66; G06F 8/71
USPC .................................................. 717/168–178
See application file for complete search history.

(56) References Cited

U.S. PATENT DOCUMENTS 8,234,485 B2 * 7/2012 Wu ...................... G06F 9/44505
717/172
8,336,030 B1 * 12/2012 Boissy .................. G06F 11/368
717/122

2009/0205011 A1 * 8/2009 Jain ........................... G06F 8/65
726/1
2018/0205759 A1 * 7/2018 Hosie ...................... H04L 67/10
2020/0073782 A1 * 3/2020 Phoenix ............. G06F 11/3604
(Continued)

FOREIGN PATENT DOCUMENTS

GB 2341462 A * 3/2000 ............. G06F 8/658
WO WO-2014202934 A1 * 12/2014 ............... G06F 8/61

OTHER PUBLICATIONS

Höhn, Sebastian, et al., Rubacon: Automated Support for Model-based Compliance Engineering, ICSE '08: Proceedings of the 30th international conference on Software engineering, May 2008, 4 pages, [retrieved on Nov. 6, 2025], Retrieved from the Internet: <URL: http://dl.acm.org/>.*

(Continued)

*Primary Examiner* — Geoffrey R St Leger
(74) *Attorney, Agent, or Firm* — Kilpatrick Townsend & Stockton LLP; Michael A. Springs, Esq.

(57) ABSTRACT

A system can be provided for updating software applications to facilitate compliance with standard requirements. For example, the system can detect a modification to a requirement of a standard. In response to detecting the modification, the system can identify versions of a software application required to comply with the standard. Each version of the software application can be executing at a node in a distributed computing environment. The system can further identify a feature of the software application that is associated with the modified requirement of the standard. The feature can be different for each version of the software application. Additionally, the system can determine, based on the feature, a particular version of the software application that is incompliant with the modified requirement of the standard. The system can then generate a targeted update, which can be used to reconfigure the feature of the particular version of the software application.

17 Claims, 3 Drawing Sheets

(56) References Cited

U.S. PATENT DOCUMENTS

2021/0149664 A1* 5/2021 Brak ..................... H04W 12/06

OTHER PUBLICATIONS

Falazi Ghareeb, et al., On Unifying the Compliance Management of Applications Based on IaC Automation, 2022 IEEE 19th International Conference on Software Architecture Companion, Mar. 2022, 4 pages, [retrieved on Nov. 6, 2025], Retrieved from the Internet: <URL:http://ieeexplore.ieee.org/>.*

* cited by examiner

200

| 202<br>Detect a modification to a requirement of a standard |
| --- |

| 204<br>Identify a plurality of versions of the software application required to comply with the standard |
| --- |

| 206<br>Identify a feature of the software application that is associated with the modified requirement of the standard |
| --- |

| 208<br>Determine, based on the feature, a particular version of the plurality of versions of the software application that is incompliant with the modified requirement of the standard |
| --- |

| 210<br>Generate a targeted update usable to reconfigure the feature of the particular version of the software application to satisfy the modified requirement of the standard. |
| --- |

FIG. 2

UPDATING SOFTWARE APPLICATIONS TO FACILITATE COMPLIANCE WITH STANDARD REQUIREMENTS IN A DISTRIBUTED COMPUTING SYSTEM

TECHNICAL FIELD

The present disclosure relates generally to distributed computing systems and, more particularly (although not necessarily exclusively), to generating targeted updates to facilitate software application compliance with standard requirements.

BACKGROUND

Standards can represent regulatory requirements or guidelines imposed on an entity (e.g., a financial institution or a division within a financial institution) to provide stability, integrity, and accuracy in operations performed by the entity. Software (e.g., software applications or services) associated with the entity can be configured to satisfy the standards imposed on the entity. However, due to continuous technological advancements, changes in entity operations, or a combination thereof, the regulatory requirements or guidelines of the standards may change, or new standards may be created. As a result, software applications or services which were compliant with one or more standards may become incompliant with a modified or new standard.

SUMMARY

According to one example of the present disclosure, a system can include a processing device and a memory device including instructions that are executable by the processing device to perform operations. The operations can include detecting a modification to a requirement of a standard. In response to detecting the modification to the requirement of the standard, the operations can include identifying a plurality of versions of a software application required to comply with the standard, wherein each of the plurality of versions of the software application executes at a node of a plurality of nodes in a distributed computing environment. The operations can further include identifying a feature of the software application that is associated with the modified requirement of the standard, the feature being different for each version of the plurality of versions of the software application. Additionally, the operations can include determining, based on the feature, a particular version of the plurality of versions of the software application that is incompliant with the modified requirement of the standard. The operations can also include, in response to determining that the version of the software application is incompliant with the modified requirement of the standard, generating a targeted update usable to reconfigure the feature of the particular version of the software application to satisfy the modified requirement of the standard.

According to another example of the present disclosure, a non-transitory computer-readable medium may contain instructions that are executable by a processing device to cause the processing device to perform operations. The operations can include detecting a modification to a requirement of a standard. In response to detecting the modification to the requirement of the standard, the operations can include identifying a plurality of versions of a software application required to comply with the standard, wherein each of the plurality of versions of the software application executes at a node of a plurality of nodes in a distributed computing environment. The operations can further include identifying a feature of the software application that is associated with the modified requirement of the standard, the feature being different for each version of the plurality of versions of the software application. Additionally, the operations can include determining, based on the feature, a particular version of the plurality of versions of the software application that is incompliant with the modified requirement of the standard. The operations can also include, in response to determining that the version of the software application is incompliant with the modified requirement of the standard, generating a targeted update usable to reconfigure the feature of the particular version of the software application to satisfy the modified requirement of the standard.

According to a further example of the present disclosure, a computer-implemented method can include detecting a modification to a requirement of a standard. In response to detecting the modification to the requirement of the standard, the method can include identifying a plurality of versions of a software application required to comply with the standard, wherein each of the plurality of versions of the software application executes at a node of a plurality of nodes in a distributed computing environment. The method can further include identifying a feature of the software application that is associated with the modified requirement of the standard, the feature being different for each version of the plurality of versions of the software application. Additionally, the method can include determining, based on the feature, a particular version of the plurality of versions of the software application that is incompliant with the modified requirement of the standard. The method can also include, in response to determining that the version of the software application is incompliant with the modified requirement of the standard, generating a targeted update usable to reconfigure the feature of the particular version of the software application to satisfy the modified requirement of the standard.

BRIEF DESCRIPTION OF THE DRAWINGS

FIG. 2 shows a flowchart of an example of a process for updating software applications to facilitate compliance with standard requirements according to some aspects of the present disclosure.

DETAILED DESCRIPTION

Figure 1:
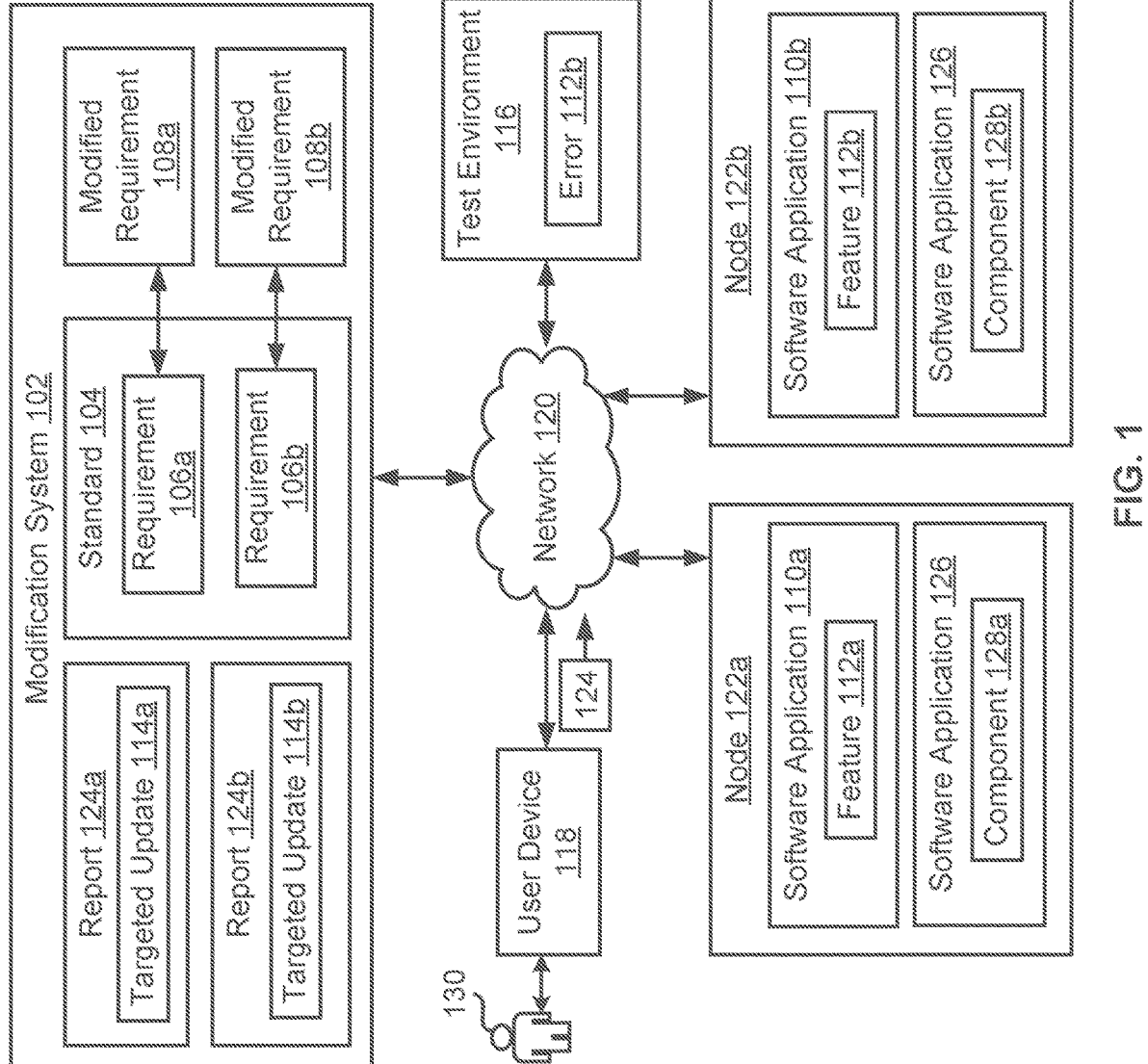
FIG. 1 shows a block diagram of an example of a distributed computing system for updating software applications to facilitate compliance with standard requirements according to some aspects of the present disclosure.

Certain aspects and examples of the present disclosure relate a system or process for generating targeted updates to facilitate software application compliance with standard requirements. In some examples, the system can detect that a new standard has been imposed on the entity or that one or more requirements of a standard have been changed. The standards can be regulatory standards imposed on the entity by a regulatory authority or the standards can be policies, rules, or the like imposed by the entity on itself. Regardless, the standards can include requirements, which can define actions the entity can perform to satisfy the standards. For example, to satisfy standards, software applications associated with the entity may be configured to store particular types or amounts of data. Thus, when a requirement of a standard is modified or a new standard is imposed on an entity, software applications or services associated with the entity may become incompliant with the standard. Being incompliant with standards may leave the software applications or service vulnerable to security breaches or may have other undesirable effects. Thus, efficient updating of software applications or services to facilitate standard compliance is desirable.

However, the software applications or services may be executing across various nodes of a distributed computing system. In particular, different versions of a software application can be executing at different nodes in the distributed computing system or various software components forming a singular software application can be distributed across the nodes of the distributed computing system. Due to the complexity of software application execution in distributed computing systems (e.g., the interoperability of different versions at different nodes or the numerous relationships among constituent software components), planning and executing updates to such software applications can be computing resource intensive and tedious. For example, current systems may perform rolling updates to software applications at one or a few nodes at a time, which can be time-consuming. Alternatively, current systems may perform blue-green updates, in which two-parallel environments are executed while an update is being implemented, thereby doubling computing resource usage for a period of time.

These strategies can be replaced with a system or process which generates targeted updates for software applications based on standard incompliance. In doing so, software applications in distributed computing environments can be updated in an efficient manner and using fewer computing resources (e.g., memory). For example, a system can identify versions of a software application executing at various nodes in a distributed computing system that are relevant to a new or modified standard. The system can further identify a feature in one or more of the versions of the software application that is relevant to the standard. Then, the system can identify versions of the software application that are incompliant with the standard based on the feature and generate an update for the software application to reconfigure the feature causing incompliance. Thus, the system can facilitate standard compliance. Additionally, the targeted nature of the update to reconfigure the specific feature of an incompliant version enables the updates to be implemented faster and with fewer computing resources than current strategies implement by current systems. For example, rather than updating the software application at a few nodes at a time or updating the software application in a parallel environment, the update may be transmitted substantially simultaneously to any nodes executing the incompliant version of the software application.

In a particular example, a modified requirement of a standard can require that a software application associated with an entity implement multi-factor authentication. In response, a system can be executed which detects the modified requirement and identifies versions of the software application executing in a distributed computing system associated with the entity. The system can further identify a feature of the software application associated with the modified requirement (e.g., an authentication mechanism of the software application). The feature may be different for different versions of the software application. For example, a newer version of the software application may offer multi-factor authentication, while an older version of the software application may not. Thus, the system can determine, based on the feature, that the older version of the software application is incompliant with the standard. The system may then generate a targeted update for the older version of the software application. For example, the system may compare an authentication flow implemented by the authentication mechanism in the newer version with an authentication flow implemented in the older version. Then, the system can, for example, configure the targeted update to add code from the authentication flow of the newer version into the authentication flow of the older version. The system can further transmit the targeted update to nodes executing the older version of the software application to cause automatic updating of the incompliant version of the software application.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 shows a block diagram of an example of a distributed computing system 100 for updating software applications to facilitate compliance with standard requirements according to some aspects of the present disclosure. Examples of the distributed computing system 100 can include a cloud computing environment, edge computing environment, grid computing environment, or the like. The distributed computing system 100 can include nodes 122*a-b* on which different versions 110*a-b* of a software application 110 can execute, on which components 128*a-b* forming a distributed software application 126 can execute, or a combination thereof. The distributed computing system 100 can further include a modification system 102 which can be part of or communicatively coupled to the nodes 122*a-b* via a network 120, such as a local area network (LAN) or the Internet. The modification system 102 can detect changes to standard requirements, detect software applications associated with the standard requirements, and generate targeted updates for modifying the software applications, if necessary. The modification system 102 may provide the targeted update to a user 130 by, for example, transmitting a report with the targeted update to a user device 118. Examples of the user device 118 can include a laptop computer, desktop computer, mobile telephone, server, or tablet. The user device 118 can be external to the modification system 102 and communicatively coupled to the modification system 102 via a network 120.

In some examples, the user 130 can be associated with an entity (e.g., a financial institution or a division within the financial institution). For example, the user 130 may be an employee or customer of the entity. The entity can be required to meet standards. For example, the standards may be regulatory standards or guidelines imposed on the entity by a regulatory authority or the standards can be policies, rules, restrictions, or the like set forth by the entity on to itself. The policies, rules, restrictions, etc. can be at least partially based on the regulatory standards and guidelines. Examples of the standards may include capital adequacy standards, liquidity standards, risk management standards, consumer protection standards, cybersecurity standards, etc. The standards can facilitate secure and efficient performance of various operations by the entity. For example, the standards can include requirements, which can define actions the entity must perform to abide by or otherwise satisfy the standards. Requirements for the standards may include the entity implementing particular security policies, risk management protocols, or performing other suitable tasks. The requirements may further include the entity maintaining particular amounts or types of data.

Additionally, software applications (e.g., mobile banking applications, payment processing software, risk management software, payroll software, or other suitable software applications or services) associated with the entity may be configured to satisfy the standards. For example, a standard 104 may be an information security standard. A first requirement 106a of the standard 104 can involve the entity implementing rule-based access control (RBAC) at one or more software applications. In particular, the first requirement 106a can specify aspects of the software application that should be accessible to different types of users. For example, tellers may be permitted to view customer account balance and transaction history, loan officers may be permitted to access and modify customer loan information, and managers can be permitted access all customer data, employee records, and application settings. A second requirement 106b of the standard 104 can involve the entity implementing multi-factor authentication at the one or more software applications. In particular, the second requirement 106b can specify that the software application should be configured authenticate users based on at least a username and password and a one-time password (OTP).

In some examples, additional standards may be created, or current standards may be modified overtime. For example, a requirement may be added to, removed from, or modified for a standard. To detect new or modified standards, a modification system 102 can be implemented. The modification system 102 can track relevant policies, standards, or regulations set forth by regulatory authorities or by the entity. For example, a regulatory authority may indicate a modification to a standard via a website affiliated with the regulatory authority, industry new sources, financial publications, etc. Thus, the modification system 102 can monitor the websites or other suitable sources for changes to standards. Additionally or alternatively, the regulatory authority may transmit official letters, emails, or other forms of correspondence to inform users (e.g., employees) associated with the entity of new or modified standards. Thus, the modification system 102 may monitor correspondence channels such as email or the users can transmit an indication (e.g., a report) indicating the new or modified standards to the modification system 102.

In a particular example, the modification system 102 may detect a change to the first requirement 108a of the standard 104. The modification may require that software applications associated with the entity include an additional user type, which should be permitted to review and audit all user (e.g., teller, loan officer, and manager) activities and application settings. In response to detecting the modification to the standard 104, the modification system 102 can identify that software application 110 is required to comply with the standard 104. The modification system 102 may identify the software application 110 based on its function. For example, the software application 110 may store customer transaction and loan data. Additionally or alternatively, the standard 104 may include an indication of associated software applications, services, or the like, which the modification system 102 may use to identify the software application 110.

The software application 110 can be executing on each of the nodes 122a-b in the distributed computing system 100.

In particular, a first version 110a of the software application 110 may be executing on a first node 122a and a second version 110b of the software application 110 may be executing at a second node 122b. The second version 110b of the software application 110 may be a newer or more recently updated than the first version 110a of the software application 110.

After identifying the versions 110a-b of the software application 110, the modification system 102 can determine a feature 112 of the software application 110 associated with the modified version 108a of the requirement 106a. For example, the feature 112 associated with the modified requirement 108a can be an access control list. The feature 112 can be the same type (e.g., can be the access control list) for both versions 110a-b of the software application 110. However, parameters or characteristics of the feature 112 at each version 110a-b of the software application 110 can be different. Thus, the modification system 102 can analyze the access control list of each version 110a-b of the software application 110 to determine whether each version 110a-b of the software application 110 satisfies the modified requirement 108a. In the particular example, the feature 112a (e.g., the access control list) in the first version 110a of the software application 110 may not include a role that can access all user data (e.g., customer data and employee records) and application settings. In contrast, the feature 112b (e.g., the access control list) in the second version 110b can include a role that can access all user data and application settings. Therefore, the modification system 102 can determine that the first version 110a of the software application 110 does not satisfy the modified requirement 108a of the standard 104 based on the feature 112a.

As a result, the modification system 102 can generate a targeted update 114a for reconfiguring the feature 112a to satisfy the modified requirement 108a of the standard 104. The modification system 102 can generate the targeted update 114a based on other versions of the software application, based on the modified requirement 108a, or other suitable data available to the modification system 102. In some examples, the targeted update 114a may include a general description of how to adjust the feature 112a to satisfy the modified requirement 108a (e.g., by adding a new user type to the access control list that is permitted access to customer data, employee records, and application settings). Additionally or alternatively, the targeted update 114a can include or describe a code or a configuration change for the first version 110a of the software application 110. In such examples, the targeted update 114a may include source code, configuration files or settings, or other suitable information usable to change the feature 112a in accordance with the modified requirement 108a.

In the particular example, the targeted update 114a can involve modifying a configuration file associated with the access control list for the first version software application 110a. The targeted update 114a can include the addition of a role to the configuration file that can access all user data and application settings. To determine the targeted update 114a the modification system 102 may determine that the feature 112b in the second version 110b of the software application 110 is compliant with modified requirement 108a. Thus, the modification system 102 can access and analyze the feature 112b of the second version 110b to determine a difference between the feature 112a in the first version 110a and the feature 112b in the second version 110b. The difference can be that the access control list of the second version 110b includes the additional role. The modification system 102 can then configure the targeted update 114a to involve adding the additional role.

In some examples, the modification system 102 can further generate a report 124a with the targeted update 114a. The report 124a may further include a description of the requirement 106a before modification, of the modified requirement 108a, of differences between the requirement 106a and the modified requirement 108a, or a combination thereof. Additionally, the report 124a may include a description of the feature 112a, a description of the software application 110 (e.g., an indication of the version of the software application 110 or description of tasks performed by the software application 110) or other suitable relevant information.

After generating the report 124a, the modification system 102 can transmit the report 124a to the user device 118. In some examples, a user 130 of the user device 118 can receive the report 124a and review the targeted update 114 prior to executing the targeted update 114 to modify the configuration file of the first version software application 110a. In other examples, the modification system 102 may transmit the targeted update 114a to the first node 122a. The first node 122a can be configured to implement the targeted update 114a (e.g., by modifying the configuration file in accordance with the targeted update 114a) to cause the first version 110a of the software application 110 to be in compliance with the standard 104.

Alternatively, the targeted update 114a may be executed in a test environment 116. The testing environment 116 can be an isolated environment which closely resembles an environment associated with the first version of the software application 110 (e.g., the first node 122a in the distributed computing system 100). By executing the targeted update 114a in the test environment 116, effects of modifying the software application 110 in accordance with the targeted update 114a can be examined. In this way, any errors (e.g., logic errors, runtime errors, or data corruption) caused for the first version of the software application 110 when implementing the source code, configuration file changes, or the like of the targeted update 114a can be caught and corrected. Thus, a risk of causing performance degradation, security vulnerabilities, or other undesirable affects when modifying the software application 110 can be minimized.

In an example, based on executing the targeted update 114a in the test environment, the modification system 102 may determine that modifying the first version 110a of the software application 110 did not cause errors, significantly degrade performance, or otherwise negatively affect the execution of software application 110 at the first node 122a. As a result, the modification system 102 may automatically transmit the targeted update 114a to the first node 122a to cause the first node 122a to reconfigure the feature 112a. In other examples, the modification system 102 may detect one or more errors, latency, downtime, or other suitable issues for the software application based on executing the targeted update 114a in the test environment 116. As a result, the modification system 102 may modify the targeted update 114 based on the error or issue detected.

For example, the executing the change to the configuration file may provide access to employee records to tellers and loan officers. As a result, the modification system 102 can detect that an error occurred as the modification system 102 can detect that incorrect access has been permitted for some user types. The modification system 102 may then modify the targeted update 114a. In particular, the modification system 102 may remove a portion of the configuration file changes in targeted update 114a causing the access change for tellers and loan officers. The modification system 102 may then execute the modified version of the targeted update at the test environment 116 again to determine whether the error has been resolved. If the error is resolved, the modified version of the targeted update can be transmitted to the first node 122a to reconfigure the feature 112a. If the error is not resolved or if another error is detected, the modification system 102 may perform further analysis, may transmit an alert to the user device 118, or a combination thereof. In some examples, the modification system 102 may continuously test and modify the targeted update 114a until all errors are resolved.

In another example, the modification system 102 may detect a modification to the second requirement 106b of the standard 104. The modification system 102 may detect multiple modifications to standard requirements substantially contemporaneously. The modified version 108b of the second requirement 106b can require that software applications associated with the entity enable a user to authenticate using at least a username and password, an OTP, and biometric data (e.g., face ID). The modification system 102 may determine that both versions 110a-b of the software application 110 enable users to authenticate with biometric data. Thus, the modification system 102 may not perform further actions with respect to the software application 110.

However, in the example, the modification system 102 may identify a second software application 126 required to comply with the standard 104. The second software application 126 can be a distributed software application, in which tasks or workloads of the second software application 126 are divided into software components executing across multiple nodes of a distributed computing system. Thus, the second software application 126 can be formed of at least a first software component 128a and a second software component 128b, which can execute on the first node 122a and the second node 122b respectively. The first component 128a can be an authentication service component which managers user logins, registration, and session security with respect to the second software application 126. Thus, the modification system 102 can then identify the first component 128a as being associated with the second requirement 106b. The modification system 102 may then determine, based on the first component 128a, that biometric data (e.g., face ID or fingerprint) cannot be used to authenticate with the second software application 126. Therefore, the modification system 102 can determine that second software application 126 is incompliant with the modified requirement 108b of the standard 104.

In response to determining that the second software application 126 is incompliant, the modification system 102 may generate another targeted update 114b for reconfiguring the first component 128a. For example, the targeted update 114b can involve updating a code base related to the first component 128a to add biometric data as an additional authentication mechanism that can be used to authenticate with the second software application 126. The modification system 102 can then transmit targeted update 114b to the first node 122a to cause the first node 122a to reconfigure the first component 128a in accordance with the targeted update 114b. As a result of the first node 122a implementing the targeted update 114b, the second software application 126 can become compliant with the standard 104.

Additionally or alternatively, the modification system 102 can generate another report 124b with the targeted update 114b. The report 124b can also include information regarding the modified requirement 108b of the standard 104, the second requirement 106b before modification, the second software application 126, or the first component 128*a*. The modification system 102 can further transmit the report 124*b* to the user device 118.

FIG. 2 shows a flowchart of an example of a process 200 for updating software applications to facilitate compliance with standard requirements according to some aspects of the present disclosure. Other examples may involve more operations, fewer operations, different operations, or a different order of the operations than is shown in FIG. 2. The operations of FIG. 2 are described below with reference to the components of FIG. 1 above.

At block 202, the modification system 102 can detect a modification to a requirement 106*a* of a standard 104. In an example, the standard 104 may be a data retention policy of an entity (e.g., a financial institution) and the requirement 106*a* of the standard 104 can be a transaction data retention period. The requirement 106*a* can be modified to require that the entity retain transaction data for a new length of time. For example, the requirement 106*a* may have specified that the entity should retain transaction data for three years and the modified requirement 108*a* can specify that the entity should retain transaction data for seven years. The data retention policy may be created and updated based on regulatory guidelines or standards imposed on the entity, to enhance internal auditing capabilities of the entity, or a combination thereof. The modification system 102 may monitor policies set forth by the entity, regulatory standards and guidelines imposed on the entity by regulatory authorities, or a combination thereof. As a result of the modification system 102 monitoring the policies, regulatory standards and guidelines, or the combination thereof, the modification system 102 can detect the modification to the requirement 106*a* (e.g., the change to the transaction data retention period).

At block 204, the modification system 102 can identify a plurality of versions 110*a-b* of a software application 110 required to comply with the standard 104. In the example, the modification system 102 can identify the software application 110 for managing and storing transaction records. The modification system 102 may identify the software application 110 based on its function of managing and storing transaction records. Additionally or alternatively, the data retention policy include an indication of associated software applications, services, or the like, which the modification system 102 may use to identify the software application 110. The modification system 102 may further be part of or communicatively coupled to nodes 122*a-b* to detect and identify the versions 110*a-b* of the software application 110 executing at each of the nodes 122*a-b*.

At block 206, the modification system 102 can determine a feature 112 of the software application 110 associated with the modified requirement 108*a* of the standard 104. In some examples, the modification system 102 can determine multiple features associated with the modified requirement 108*a*. For example, the modified requirement 108*a* can increase a volume of data the software application 110 must store and manage. Thus, various features of the software application 110 may be affected. For example, the modification system 102 may determine that a data storage capacity of the software application 110 is associated with the modified requirement 108*a*. Additionally, the modification system 102 can determine that mechanisms (e.g., features) of the software application 110 for archiving data, controlling user access to data, enabling users to search and retrieve data, and for automatically deleting data are associated with the modified requirement 108*a*. At least some of the features can be different for each version 110*a-b* of the software application 110.

At block 208, the modification system 102 can determine, based on the feature 112, that a version 110*a* of the software application 110 that is incompliant with the modified requirement 108*a* of the standard 104. In the example, the modification system 102 can analyze each feature. In doing so, the modification system 102 can determine that each feature is configured for retaining and managing the transaction data for the initial time period (e.g., three years) in a first version 110*a*, while each feature of a second version 110*b* of the software application 110 can be configured to retain and manage data for the new time period. Based on each feature of the first version 110*a* being configured to retain transaction data for the initial time period, the modification system 102 may conclude that the first version 110*a* is incompliant with the modified requirement 108*a* of the standard 104.

At block 210, the modification system 102 can generate a targeted update 114*a* to reconfigure the feature 112*a* of the particular version 110*a* of the software application 110 to satisfy the modified requirement 108*a* of the standard 104. In the example, after determining that each of the features do not satisfy the updated data retention policy, the targeted update 114*a* can be generated. The targeted update 114*a* may include source code, configuration file changes, or other suitable information which can be used to modify each of the features of the first version 110*a* of the software application 110. For example, the targeted update 114*a* can involve upgrading database or storage infrastructure of the first version 110*a* to enable the software application 110 to store more transaction data. The targeted update 114*a* can further involve implementing data archiving processes for additional, older transaction data at the first version 110*a*. Additionally, the targeted update 114*a* can involve adjusting access control and permission settings of the first version 110*a* with respect to the older transaction data. The targeted update 114*a* can further involve updating search and retrieval functionality of the first version 110*a* to enable users to search and access the older transaction data. Finally, the targeted update 114*a* can involve updating an automatic data deletion mechanism of the first version 110*a* to cause the mechanism to automatically delete transaction data after the new length of time (e.g., seven years).

In some examples, the modification system 102 can generate a report 124*a* with the targeted update 114*a* and transmit the report 124*a* to a user device 118. A user of the user device 118 can receive the report 124*a* and review targeted update 114*a* prior to transmitting the targeted update 114*a* to the first node 122*a*. In other examples, the targeted update 114*a* can be automatically transmitted to the first node 122*a* by the modification system 102 to cause the first node 122*a* to update the software application 110. Alternatively, the targeted update 114*a* may be executed in a test environment 116 to ensure that implementation of the targeted update 114*a* does not degrade performance of or otherwise cause errors for the software application 110.

After the targeted update 114*a* is implemented, each of the features can be configured to satisfy the modified requirement 108*a*. Thus, the first version 110*a* of the software application 110 can be in compliance with the data retention policy. For example, by updating the automatic data deletion mechanism, upgrading the database or storage infrastructure, and implementing the data archiving processes, the first version 110*a* can properly store and manage transaction data for the new length of time. Additionally, by transmitting the targeted update 114a to the first node 122a for implementation, the first version 110a of the software application 110 compliance with the standard 104 can be facilitated in a computationally efficient manner.

Figure 3:
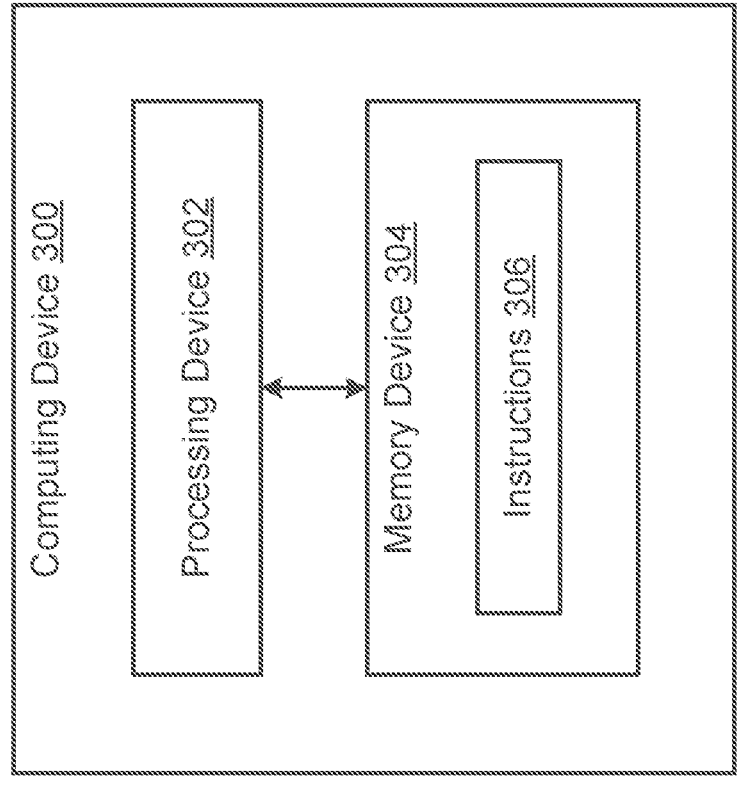
FIG. 3 depicts a block diagram of an example of a computing device usable to implement some aspects of the present disclosure.

FIG. 3 depicts a block diagram of an example of a computing device 300 usable to implement some aspects of the present disclosure. For example, the computing device 300 can serve as the modification system 102 of FIG. 1.

The computing device 300 includes a processing device 302 coupled to a memory device 304 via a bus. The processing device 302 can include one processing device or multiple processing devices. Non-limiting examples of the processing device 302 include a Field-Programmable Gate Array (FPGA), an application-specific integrated circuit (ASIC), a microprocessor, or any combination of these. The processing device 302 can execute instructions 306 stored in the memory device 304 to perform operations. Examples of such operations can include any of the operations described above with respect to the modification system 102. In some examples, the instructions 306 can include processor-specific instructions generated by a compiler or an interpreter from code written in any suitable computer-programming language, such as C, C++, C#, Python, or Java.

The memory device 304 can include one memory device or multiple memory devices. The memory device 304 can be volatile or non-volatile, such that the memory device 304 retains stored information when powered off. Non-limiting examples of the memory device 304 include electrically erasable and programmable read-only memory (EEPROM), flash memory, or any other type of non-volatile memory. At least some of the memory device can include a non-transitory computer-readable medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 306.

The computing device 300 may also include other input and output (I/O) components, which are not shown here for simplicity. The input components can include a mouse, a keyboard, a trackball, a touch pad, a touch-screen display, or any combination of these. The output components can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the system to perform operations comprising:
detecting a modification to a requirement of a standard;

in response to detecting the modification to the requirement of the standard:
identifying a plurality of versions of a software application required to comply with the standard, wherein each of the plurality of versions of the software application executes at a node of a plurality of nodes in a distributed computing environment;
identifying a feature of the software application that is associated with the modified requirement of the standard, the feature being different for each version of the plurality of versions of the software application;
determining, based on the feature, a particular version of the plurality of versions of the software application that is incompliant with the modified requirement of the standard;
in response to determining that the particular version of the software application is incompliant with the modified requirement of the standard, generating a targeted update usable to reconfigure the feature of the particular version of the software application to satisfy the modified requirement of the standard;
executing the targeted update in a test environment associated with the distributed computing environment;
determining, based on executing the targeted update in the test environment, that the execution of the targeted update causes an error at the particular version of the software application; and
based on determining that the execution of the targeted update causes the error, modifying the targeted update based on the error to generate a modified version of the targeted update.

2. The system of claim 1, wherein the operations further comprise:
transmitting the modified version of the targeted update to each node of the plurality of nodes executing the particular version of the software application, wherein each node of the plurality of nodes is configured to automatically implement the modified version of the targeted update to reconfigure the feature of the particular version of the software application to cause compliance with the standard.

3. The system of claim 1, wherein the particular version of the software application is a first version of the software application, and wherein the operations further comprise:
determining, based on the feature, a second version of the plurality of versions of the software application that is compliant with the modified requirement of the standard;
determining one or more differences between the feature in the first version of the software application and the feature in the second version of the software application; and
wherein the targeted update is generated based at least in part on the one or more differences.

4. The system of claim 1, wherein the operations further comprise:
subsequent to modifying the targeted update, automatically executing the modified version of the targeted update in the test environment;
determining, based on the execution of the modified version of the targeted update in the test environment, that the execution of the modified version of the targeted update does not cause the error at the particular version of the software application; and in response to determining that the execution of the modified version of the targeted update does not cause the error, transmit the modified version of the targeted update to each node of the plurality of nodes executing the particular version of the software application to cause each node of the plurality of nodes to implement the targeted update to reconfigure the feature of the particular version of the software application.

5. The system of claim 1, wherein the software application is a first software application and the targeted update is a first targeted update, and wherein the operations further comprise:

identifying a plurality of components collectively forming a second software application that is required to comply with the standard, wherein each component of the plurality of components of the second software application executes at a node of the plurality of nodes in the distributed computing environment;

identifying a particular component of the plurality of components that is associated with the modified requirement of the standard;

determining, based on an analysis of the particular component, that the particular component is incompliant with the modified requirement of the standard; and in response to determining that the particular component is incompliant with the modified requirement of the standard, generating a second targeted update usable to reconfigure the particular component of the second software application to satisfy the modified requirement of the standard.

6. The system of claim 1, wherein the targeted update describes a code change for the particular version of the software application, a configuration change for the particular version of the software application, or a combination thereof.

7. The system of claim 1, wherein the operations further comprise:

generating a report comprising the targeted update, the feature, the particular version of the software application, the modified requirement, and the standard; and transmitting the report to a user device.

8. A computer-implemented method comprising:

detecting a modification to a requirement of a standard;

in response to detecting the modification to the requirement of the standard:

identifying a plurality of versions of a software application required to comply with the standard, wherein each of the plurality of versions of the software application executes at a node of a plurality of nodes in a distributed computing environment;

identifying a feature of the software application that is associated with the modified requirement of the standard, the feature being different for each version of the plurality of versions of the software application;

determining, based on the feature, a particular version of the plurality of versions of the software application that is incompliant with the modified requirement of the standard;

in response to determining that the version of the software application is incompliant with the modified requirement of the standard, generating a targeted update usable to reconfigure the feature of the particular version of the software application to satisfy the modified requirement of the standard;

executing the targeted update in a test environment associated with the distributed computing environment;

determining, based on executing the targeted update in the test environment, that the execution of the targeted update causes an error at the particular version of the software application; and based on determining that the execution of the targeted update causes the error, modifying the targeted update based on the error to generate a modified version of the targeted update.

9. The computer-implemented method of claim 8, further comprising:

transmitting the modified version of the targeted update to each node of the plurality of nodes executing the particular version of the software application, wherein each node of the plurality of nodes is configured to automatically implement the modified version of the targeted update to reconfigure the feature of the particular version of the software application to cause compliance with the standard.

10. The computer-implemented method of claim 8, wherein the particular version of the software application is a first version of the software application, and wherein the computer-implemented method further comprises:

determining, based on the feature, a second version of the plurality of versions of the software application that is compliant with the modified requirement of the standard;

determining one or more differences between the feature in the first version of the software application and the feature in the second version of the software application; and wherein the targeted update is generated based at least in part on the one or more differences.

11. The computer-implemented method of claim 8, further comprising:

subsequent to modifying the targeted update, automatically executing the modified version of the targeted update in the test environment;

determining, based on the execution of the modified version of the targeted update in the test environment, that the execution of the modified version of the targeted update does not cause the error at the particular version of the software application; and in response to determining that the execution of the modified version of the targeted update does not cause the error, transmit the modified version of the targeted update to each node of the plurality of nodes executing the particular version of the software application to cause each node of the plurality of nodes to implement the targeted update to reconfigure the feature of the particular version of the software application.

12. The computer-implemented method of claim 8, wherein the software application is a first software application and the targeted update is a first targeted update, and wherein the computer-implemented method further comprises:

identifying a plurality of components collectively forming a second software application that is required to comply with the standard, wherein each component of the plurality of components of the second software application executes at a node of the plurality of nodes in the distributed computing environment;

identifying a particular component of the plurality of components that is associated with the modified requirement of the standard;

determining, based on an analysis of the particular component, that the particular component is incompliant with the modified requirement of the standard; and in response to determining that the particular component is incompliant with the modified requirement of the standard, generating a second targeted update usable to reconfigure the particular component of the second software application to satisfy the modified requirement of the standard.

13. The computer-implemented method of claim 8, wherein the targeted update describes a code change for the particular version of the software application, a configuration change for the particular version of the software application, or a combination thereof.

14. A non-transitory computer-readable medium comprising instructions that are executable by a processing device for causing the processing device to perform operations comprising:

detecting a modification to a requirement of a standard;

in response to detecting the modification to the requirement of the standard:

identifying a plurality of versions of a software application required to comply with the standard, wherein each of the plurality of versions of the software application executes at a node of a plurality of nodes in a distributed computing environment;

identifying a feature of the software application that is associated with the modified requirement of the standard, the feature being different for each version of the plurality of versions of the software application;

determining, based on the feature, a particular version of the plurality of versions of the software application that is incompliant with the modified requirement of the standard;

in response to determining that the version of the software application is incompliant with the modified requirement of the standard, generating a targeted update usable to reconfigure the feature of the particular version of the software application to satisfy the modified requirement of the standard;

executing the targeted update in a test environment associated with the distributed computing environment;

determining, based on executing the targeted update in the test environment, that the execution of the targeted update causes an error at the particular version of the software application; and based on determining that the execution of the targeted update causes the error, modifying the targeted update based on the error to generate a modified version of the targeted update.

15. The non-transitory computer-readable medium of claim 14, wherein the operations further comprise:

transmitting the modified version of the targeted update to each node of the plurality of nodes executing the particular version of the software application, wherein each node of the plurality of nodes is configured to automatically implement the modified version of the targeted update to reconfigure the feature of the particular version of the software application to cause compliance with the standard.

16. The non-transitory computer-readable medium of claim 14, wherein the particular version of the software application is a first version of the software application, and wherein the operations further comprise:

determining, based on the feature, a second version of the plurality of versions of the software application that is compliant with the modified requirement of the standard;

determining one or more differences between the feature in the first version of the software application and the feature in the second version of the software application; and wherein the targeted update is generated based at least in part on the one or more differences.

17. The non-transitory computer-readable medium of claim 14, wherein the operations further comprise:

subsequent to modifying the targeted update, automatically executing the modified version of the targeted update in the test environment;

determining, based on the execution of the modified version of the targeted update in the test environment, that the execution of the modified version of the targeted update does not cause the error at the particular version of the software application; and in response to determining that the execution of the modified version of the targeted update does not cause the error, transmit the modified version of the targeted update to each node of the plurality of nodes executing the particular version of the software application to cause each node of the plurality of nodes to implement the targeted update to reconfigure the feature of the particular version of the software application.

* * * * *